United States Patent
Hoehne

(10) Patent No.: US 12,474,092 B2
(45) Date of Patent: Nov. 18, 2025

(54) REGENERATOR FOR A CRYO-COOLER WITH HELIUM AS A WORKING GAS AND AS A HEAT-STORING MATERIAL

(71) Applicant: Pressure Wave Systems GmbH, Taufkirchen (DE)

(72) Inventor: Jens Hoehne, Munich (DE)

(73) Assignee: Pressure Wave Systems GmbH, Taufkirchen (DE)

( * ) Notice: Subject to any disclaimer, the term of this patent is extended or adjusted under 35 U.S.C. 154(b) by 347 days.

(21) Appl. No.: 18/219,117

(22) Filed: Jul. 7, 2023

(65) Prior Publication Data

US 2023/0349596 A1 Nov. 2, 2023

Related U.S. Application Data

(63) Continuation-in-part of application No. PCT/EP2021/087409, filed on Dec. 22, 2021.

(30) Foreign Application Priority Data

Jan. 11, 2021 (DE) .......................... 202021100084.8

(51) Int. Cl.
F25B 9/14 (2006.01)

(52) U.S. Cl.
CPC .......... *F25B 9/14* (2013.01); *F25B 2309/003* (2013.01); *F25B 2309/1415* (2013.01)

(58) Field of Classification Search
CPC ...... F25B 9/14; F25B 9/145; F25B 2309/003; F25B 2309/1415
See application file for complete search history.

(56) References Cited

U.S. PATENT DOCUMENTS

| | | | |
|---|---|---|---|
| 11,333,406 B2 | 5/2022 | Hoehne | F25B 9/145 |
| 2001/0025494 A1 | 10/2001 | Okamura et al. | F25B 9/00 62/6 |

(Continued)

FOREIGN PATENT DOCUMENTS

| | | |
|---|---|---|
| CN | 110050161 A | 12/2017 |
| DE | 19924184 A1 | 5/1999 |

(Continued)

OTHER PUBLICATIONS

Decision of Rejection of the Chinese Patent Office dated Jul. 17, 2025 in a related Chinese patent application CN202180089118.4, as well as an English translation of the Chinese Decision of Rejection (12 pages).

(Continued)

*Primary Examiner* — Brian M King
(74) *Attorney, Agent, or Firm* — Imperium Patent Works; Darien K. Wallace

(57) ABSTRACT

A regenerator for a cryocooler includes a cell, a flow passage, a capillary and supporting elements. A cell wall encloses a cavity with sub-cavities. A connecting passage connects a first sub-cavity to a second sub-cavity. A first cell partition is disposed between the first and second sub-cavities. The flow passage is also disposed between the first and second sub-cavities. During operation of the regenerator, helium in the cavity functions as a heat-storing material, while helium that flows through the flow passage functions as a working gas. The capillary forms a pressure-equalizing opening in the cell wall and connects the helium that functions as the heat-storing material inside the cavity to the helium that functions as the working gas outside the cavity. The supporting elements are inside the first sub-cavity and separate the first cell partition from a second cell partition.

(Continued)

The first and second cell partitions enclose the first sub-cavity.

20 Claims, 2 Drawing Sheets

(56) References Cited

U.S. PATENT DOCUMENTS

| | | | | |
|---|---|---|---|---|
| 2014/0013775 | A1 | 1/2014 | Koizumi | B23P 15/26 |
| 2019/0323737 | A1 | 10/2019 | Hoehne | F25B 9/145 |
| 2022/0057114 | A9 | 2/2022 | Hoehne | F25B 9/145 |

FOREIGN PATENT DOCUMENTS

| | | |
|---|---|---|
| DE | 102005007627 A1 | 2/2005 |
| DE | 102017203506 A1 | 3/2017 |
| EP | 0860667 A1 | 2/1998 |
| JP | H07 318181 A | 5/1994 |
| JP | 2019-536972 | 12/2017 |

OTHER PUBLICATIONS

Office action dated Jan. 23, 2025, from the European Patent Office in the related European application 21844322.4 (5 pages).
English translation of the Office action dated Jan. 23, 2025, from the European Patent Office in the related European application 21844322.4 (3 pages).
Int'l Search Report of Int'l Searching Authority (EPO) in the related PCT application PCT/EP2021/087409 dated Mar. 17, 2022 and an English translation of the search report (5 pages).
Written Opinion of Int'l Searching Authority (EPO) in the related PCT application PCT/EP2021/087409 dated Mar. 17, 2022 (6 pages).
Search Report of the German Patent Office in the related German patent application DE202021100084.8 dated Sep. 18, 2021 and an English translation of the search report (5 pages).
Office action dated Apr. 17, 2024 of the Japanese Patent Office in the related Japanese patent application JP P2023-541267 and an English translation of the Japanese Office action (10 pages).
Office action and examination opinion of the Chinese Patent Office in a related Chinese patent application CN202180089118.4 dated Jun. 19, 2025, as well as the English translation of the Chinese Office action and examination opinion (16 pages).

REGENERATOR FOR A CRYO-COOLER WITH HELIUM AS A WORKING GAS AND AS A HEAT-STORING MATERIAL

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2021/087409, filed on Dec. 22, 2021, and published as WO 2022/148666 A1 on Jul. 14, 2022, which in turn claims priority from German Application No. 202021100084.8, filed in Germany on Jan. 11, 2021. This application is a continuation-in-part of International Application No. PCT/EP2021/087409, which is a continuation of German Application No. 202021100084.8. International Application No. PCT/EP2021/087409 is pending as of the filing date of this application, and the United States is an elected state in International Application No. PCT/EP2021/087409. This application claims the benefit under 35 U.S.C. § 119 from German Application No. 202021100084.8. The disclosure of each of the foregoing documents is incorporated herein by reference.

TECHNICAL FIELD

The present disclosure relates to a regenerator for cryocoolers with helium as working gas, a method for manufacturing such a regenerator, and a cryocooler provided with such a regenerator.

BACKGROUND

Helium is often used as a working gas in cryocoolers. Helium has a comparatively high heat capacity in the temperature range of 2K to 20K, equaling the heat capacity of rare earth compounds in this temperature range. Therefore, it has been proposed to use helium as a regenerator material. From US 2012/0304668 A1, DE 10319510 A1, DE 102005007627 A1, CN 104197591 A, DE 19924184 A1 and U.S. Pat. No. 4,359,872, closed hollow bodies of glass or metal filled with helium are known as regenerator structures. This basic idea has not yet led to a finished product. In addition, beads filled with helium again lead to abrasion, which reduces the service life of the cryocooler. The basic problem of these known closed hollow bodies with helium is the complex filling of the hollow bodies with helium under overpressure. Due to the overpressure, the wall thickness of the hollow bodies has to be increased, which leads to a reduction in heat transfer resistance.

In the article "Heat Capacity Characterization of a 4K Regenerator with Non-Rare Earth Material" in Cryocoolers 19, International Cryocooler Conference, Inc., Boulder, CO, 2016, a structure with absorber material that can absorb helium is proposed as a regenerator for cryocoolers. The structure of the regenerator is complicated and costly, and there is a risk that parts of the absorber material will be swept up in the working gas flow. Due to the absorber particles that are drawn into the working gas flow, the service life of a cryocooler with such a regenerator would be drastically reduced.

JP H07318181 describes a regenerator in which the helium-filled hollow bodies are sealed by thermal shrinking. CN 104 197 591 A describes a regenerator comprising cuboid cells filled with helium as a heat-storing material. The cells are sealed after filling and consequently do not have pressure-equalizing openings. From JP S62-233688A a regenerator is known that has metal as a heat-storing material for storing heat; helium is not used as the heat-storing material.

From JP 2011190953A, a regenerator with tubes open on both sides, which contain helium as heat-storing material, is known. The helium-filled tubes thus have pressure-equalizing openings, so that pressure equalization can take place between the interior of the tubes and the helium working gas during operation of the cooler or regenerator. A disadvantage of this regenerator is that adjacent cells filled with helium as a heat transfer material lie on top of each other, and the sections of the cell walls lying on top of each other cannot contribute to the heat exchange. This limits the functionality of this known regenerator.

From WO 2018/104410 A1, a regenerator is known that is configured for helium as a working gas and heat-storing material. The known regenerator comprises a cavity with several sub-cavities, which are tubular and connected to each other. Flow passages for the helium working gas are formed between the sub-cavities. A pressure-equalizing opening in the form of a capillary, which passes through the cell walls, creates a permanently open connection between the helium working gas outside the cavity and the helium heat-storing material inside the cavity. The thinner the cell walls, the better the heat transfer between the helium working gas and the helium heat-storing material through the cell walls. However, a minimum thickness of the cell walls is required so that they do not break or crack with the pressure fluctuations during operation of the regenerator.

Therefore, based on WO 2018/104410 A1, it is the object of the present disclosure to design a regenerator with helium as both the working gas and the heat-storing material that enables a more effective heat transfer through the cell walls compared to WO 2018/104410 A1.

SUMMARY

A regenerator for a cryocooler with helium as a working gas and as a heat-storing medium, with at least one cell with cell walls that enclose a cavity that has a number of sub-cavities. The sub-cavities are connected to one another by way of at least one connecting channel and, with the exception of the at least one connecting channel to other sub-cavities, are enclosed by the cell walls. The cavity of the at least one cell is filled with helium gas functioning as a heat-storing material. The regenerator also includes flow channels for helium as the working gas, which are formed between the individual sub-cavities and have a pressure-equalizing opening in the form of a capillary that passes through the cell walls and forms a permanent open connection between the helium as the working gas outside the cavity and the helium as the heat-storing material inside the cavity. In their interior, the sub-cavities have supporting elements that provide mutual support for the cell walls that delimit each sub-cavity A regenerator for a cryocooler that uses helium both as a working gas and as a heat-storing medium includes a cell, a flow passage, a capillary and a plurality of supporting elements. The cell includes a cell wall that encloses a cavity with first and second sub-cavities. The first sub-cavity is connected to the second sub-cavity via a connecting passage. The cell is cylindrical, and the connecting passage is disposed around the circumference of the cell. A first cell partition is disposed between the first sub-cavity and the second sub-cavity. The cavity is filled with helium that functions as a heat-storing material during operation of the regenerator. The flow passage is disposed between the first sub-cavity and the second sub-cavity. Helium that functions as a working gas flows through the flow passage during operation of the regenerator.

The capillary forms a pressure-equalizing opening in the cell wall and connects the helium that functions as the heat-storing material inside the cavity to the helium that functions as the working gas outside the cavity. In one embodiment, the capillary is formed as an artifact of 3D printing. The plurality of supporting elements are disposed inside the first sub-cavity. The first cell partition is separated from a second cell partition by the supporting elements, which brace the first cell partition against the second cell partition. The first cell partition and the second cell partition enclose the first sub-cavity.

In one embodiment, the first sub-cavity is tubular due to the shape of the cell wall and the first cell partition. In another embodiment, the first sub-cavity has an internal meander shape formed by the supporting elements and the first cell partition. In one embodiment, the first cell partition is cylindrical, whereas in another embodiment, the first cell partition is planar.

In another embodiment, a regenerator for a cryocooler includes a cell, a plurality of flow passages, a pressure-equalizing opening, and a plurality of supporting elements. The cell includes a cell wall that encloses a cavity. The cavity includes a plurality of sub-cavities that are interconnected by a connecting passage. A first cell partition and a second cell partition enclose a first sub-cavity. The cavity is filled with helium that functions as a heat-storing material. The plurality of flow passages are disposed between individual sub-cavities. Helium that functions as a working gas flows through the flow passages. The pressure-equalizing opening penetrates the cell wall and forms a connection between the helium that functions as the working gas outside the cavity and the helium that functions as the heat-storing material inside the cavity. The plurality of supporting elements are disposed inside the sub-cavities. The first cell partition is separated from the second cell partition by the supporting elements. The supporting elements brace the first cell partition against the second cell partition.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
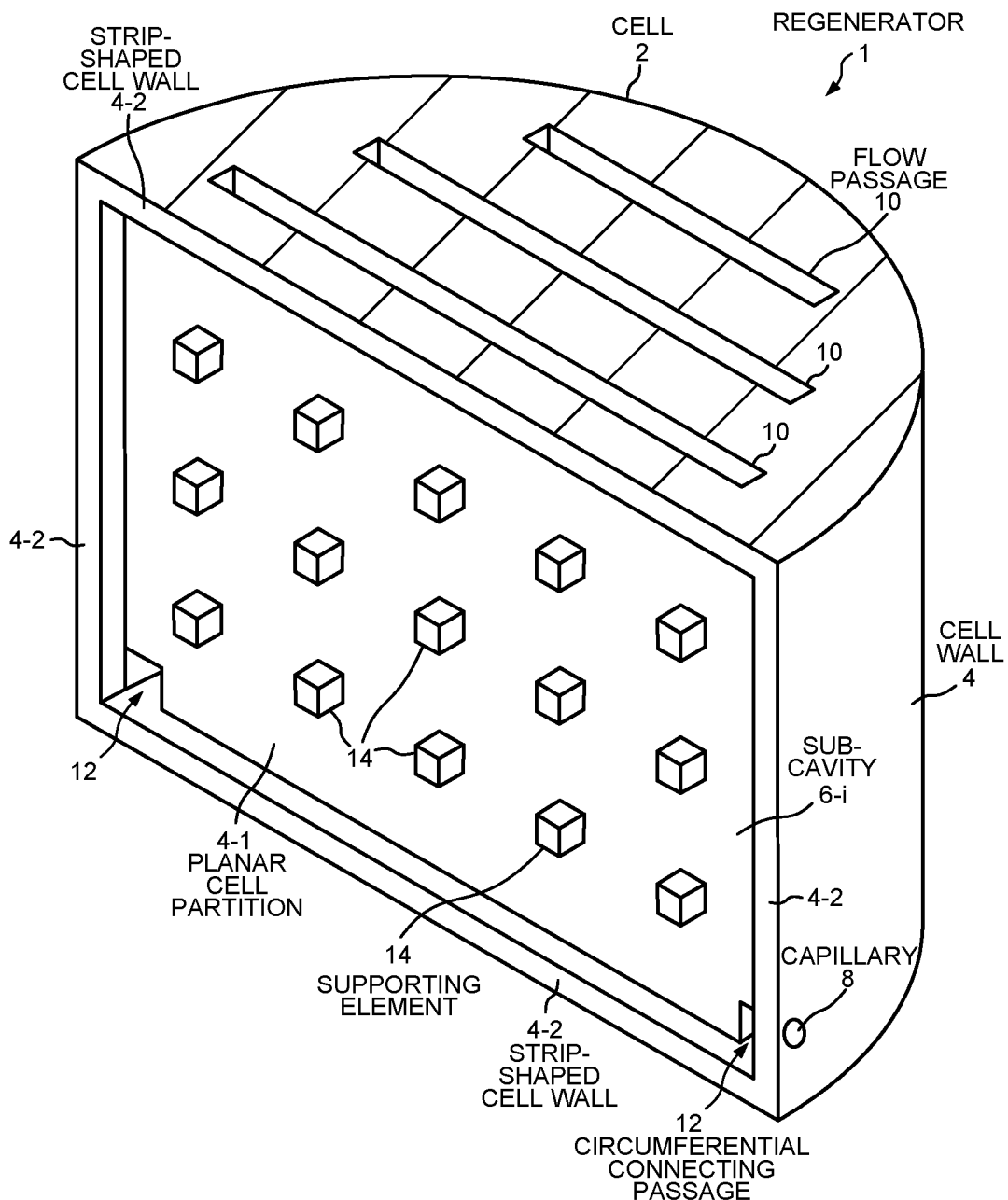
FIG. 1 shows a perspective sectional view of a first embodiment of the regenerator.

FIG. 1 is a cross-sectional view of a regenerator 1 comprising a cell 2. Due to a capillary 8 in the cell walls 4, the interior of the sub-cavities fills with helium as a heat-storing medium when the regenerator 1 is started up. Since comparable pressure conditions exist within the cavity 6 or sub-cavities 6-$i$ during operation, the cell walls can be constructed to be comparatively thin. However, at least a minimum thickness of the cell walls is required so that they do not break or crack during the pressure fluctuations during operation of the regenerator. The fact that the sub-cavities have supporting elements in their interior means that the cell walls can be made even thinner because the thin cell walls are supported by the supporting elements. The thinner cell walls improve heat transfer through the cell walls. The ratio of cavity volume to opening area or outflow resistance of the capillary is selected in such a way that the pressure in the cavity or sub-cavities barely changes or at least only slightly changes in the operating frequency range of the cooler operation (approximately 1 to 60 Hz). This mode of operation is comparable to a capacitor at high frequencies, which is virtually unaffected by the change in voltage if the capacitance is high enough and the change in voltage is small. In a typical application, the pressure in the cell will always fluctuate around the medium pressure of the cooling system, typically around 16 bar. The stable pressure is important because otherwise the volume of the cavity or cavities would be a large contributor to the "dead volume" if its pressure fluctuated between, for example, 8 and 24 bar every period without contributing to cooling. The opening area or the outflow resistance of the pressure-equalizing opening is selected in such a way that helium enters the cavity or cavities before the regenerator is started up as well as during the start-up phase due to the prevailing pressure conditions. Due to the high outflow resistance of the pressure-equalizing opening, the "condenser effect" explained above results during the pressure fluctuations in the area of the regenerator with the operating frequency of a cooler. During the start-up phase of regenerator 1, the temperature of the helium working gas and also of the helium in the regenerator cavities decreases. Consequently, the volume of helium decreases, and helium continues to flow into the regenerator cavities via the pressure-equalizing opening. This means that helium has to be replenished during the start-up phase until the working temperatures and pressures have been established.

The cell 2 is interspersed with flow passages 10, which are bounded by the cell walls 4. This results in an increased heat exchange surface and thus improved heat transfer between the helium in the cavities and the working gas outside. The flow passages 10 are preferably in the form of slots. The slot-shaped flow passages for working gas preferably run in straight lines that are parallel to each other, on the one hand to minimize flow resistance and on the other hand to make the tubular cavities between them uniform. The straightness and parallelism result in an equal distance between two flow passages in a simple manner.

Optionally, the flow passages between the sub-cavities are arranged parallel to each other.

The pressure-equalizing opening may also be provided by leaks that occur during the manufacture of the cells.

In order to improve the heat exchange between the helium working gas and the helium heat-storing medium in the hollow body, the surfaces of the flow passages are provided with swirl structures.

In 3D printing processes, cuboid cavities or rounded cavities can be produced as a whole or in two steps from two components. Openings in the sub-cavities that are necessary for blowing out material after 3D printing can subsequently be closed. Since these openings have small cross-sectional areas, welding processes are suitable for this purpose. An opening in the cell wall that is an artifact of 3D printing can be used as a capillary through which helium that functions as a heat-storing medium enters the cavity when the regenerator starts operating.

Preferably, the supporting elements 14 are provided with slits in the form of blind holes that are accessible to the helium working gas. This allows thermal stresses occurring during 3D printing to be absorbed in the manner of an accordion so that cracks do not occur in the material.

The regenerators according to the present disclosure are particularly suitable for Stirling, Gifford-McMahon or pulse tube coolers in particular.

The entire regenerator preferably has a thickness of 5 mm to 100 mm in the direction of the flow of the working gas.

Figure 2:
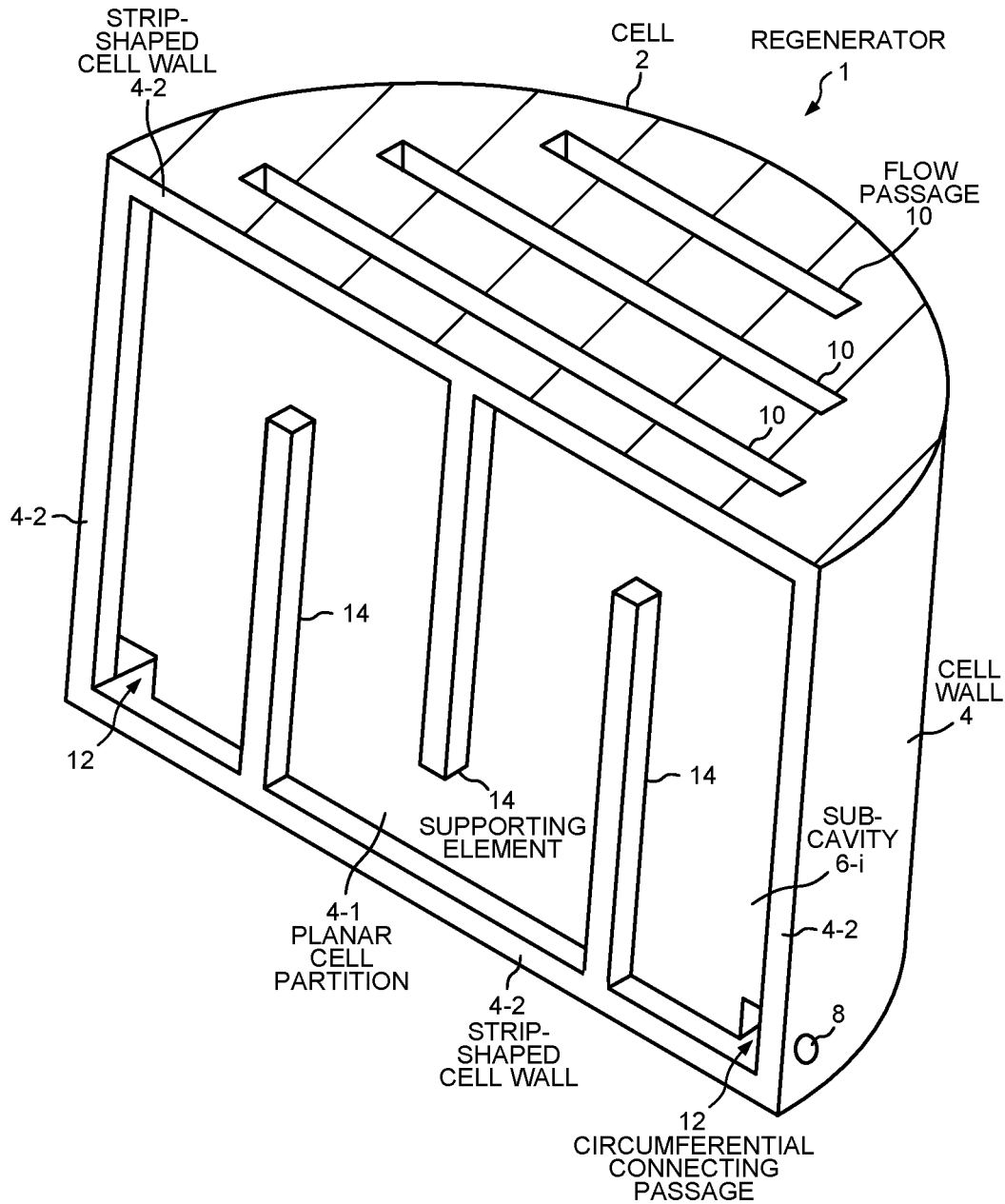
FIG. 2 shows a perspective sectional view of a second embodiment.

FIGS. 1 and 2 show two embodiments of the disclosure in the form of a cylindrical, column-shaped regenerator 1 with a circular cross-section, wherein only one half of the regenerator 1 is shown in each case. The regenerator 1 comprises a cell 2 with cell walls 4 that enclose a cavity 6 with sub-cavities 6-*i*. The cell walls 4 are penetrated by a pressure-equalizing opening in the form of a capillary 8. The cell 2 has a circular ring-shaped cross-section and is arranged in a tubular flow passage for the helium working gas. During operation, the interior of the cavity 6 is filled with helium as a heat-storing material. The sub-cavities 6-*i* form planar structures parallel to the longitudinal axis of the cell 2. Between the planar sub-cavities 6-*i*, parallel slot-shaped flow channels 10 are formed for helium as the working gas. The sub-cavities 6-*i* are interconnected in the rim region of the cylindrical regenerator 1 by a connecting passage 12. The sub-cavity 6-*i* together with the other sub-cavities 6-*i* form the cavity 6. The individual planar and parallel sub-cavities 6-*i* extend over the entire height or length of the column-shaped cell 2 and are formed by two spaced-apart, planar cell partitions 4-1, sealed in the rim region by strip-shaped cell walls 4-2. The slit-shaped flow passages 10 completely penetrate the cell 2 and are disposed between the individual sub-cavities 6-*i*.

Supporting elements 14 are provided inside the sub-cavities 6-*i*, which support the planar cell partitions 4-1 against each other. In the first embodiment according to FIG. 1, the supporting elements 14 are formed as small cuboids distributed over the interior of the sub-cavities 6-*i*. The supporting elements 14 may also be column-shaped or rounded and spherical.

In the second embodiment shown in FIG. 2, the supporting elements 14 are strip-shaped and extend away from the strip-shaped cell walls 4-2 so as to form a meandering passage. The strip-shaped supporting elements 14 support and reinforce the planar cell partitions 4-1. The strip-shaped supporting elements 14 are provided with slits in the form of blind holes, not shown, which are accessible to the helium working gas. This allows thermal stresses occurring during 3D printing to be absorbed in the manner of an accordion so that cracks do not develop in the material.

REFERENCE NUMERALS

1 regenerator
2 cell
4 cell wall
4-1 planar cell partitions
4-2 strip-shaped cell walls
6 cavity
6-*i* sub-cavity
8 capillary
10 flow passage for working gas
12 circumferential connecting passage
14 supporting elements Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A regenerator, comprising:
a cell that includes a cell wall that encloses a cavity, wherein the cavity includes a first sub-cavity and a second sub-cavity, wherein the first sub-cavity is connected to the second sub-cavity via a connecting passage, wherein a first cell partition is disposed between the first sub-cavity and the second sub-cavity, and wherein the cavity is filled with helium that functions as a heat-storing material during operation of the regenerator;
a flow passage disposed between the first sub-cavity and the second sub-cavity, wherein helium that functions as a working gas flows through the flow passage during operation of the regenerator;
a capillary that forms a pressure-equalizing opening in the cell wall and that connects the helium that functions as the heat-storing material inside the cavity to the helium that functions as the working gas outside the cavity; and
a plurality of supporting elements disposed inside the first sub-cavity, wherein the first cell partition is separated from a second cell partition by the supporting elements, wherein the supporting elements brace the first cell partition against the second cell partition, and wherein the first cell partition and the second cell partition enclose the first sub-cavity.

2. The regenerator of claim 1, wherein the first sub-cavity is tubular due to the shape of the cell wall and the first cell partition.

3. The regenerator of claim 1, wherein the first sub-cavity has an internal meander shape formed by the supporting elements and the first cell partition.

4. The regenerator of claim 1, wherein the supporting elements are strip-shaped and extend away from the cell wall into the first sub-cavity.

5. The regenerator of claim 4, wherein the strip-shaped supporting elements include holes through which the helium that functions as the working gas can pass.

6. The regenerator of claim 1, wherein the first cell partition is planar.

7. The regenerator of claim 1, wherein the first cell partition is cylindrical.

8. The regenerator of claim 1, wherein the first sub-cavity has a rectangular cross-section.

9. The regenerator of claim 1, wherein the first sub-cavity has a circular cross-section.

10. The regenerator of claim 1, wherein the flow passage has a rectangular cross-section.

11. The regenerator of claim 1, wherein the cell is cylindrical and has a circumference, and wherein the connecting passage is disposed around the circumference of the cell.

12. The regenerator of claim 1, wherein the capillary is formed as an artifact of 3D printing.

13. The regenerator of claim 1, wherein the first cell partition imparts a swirl structure to the flow passage.

14. A regenerator for a cryocooler, comprising:
a cell that includes a cell wall that encloses a cavity, wherein the cavity comprises a plurality of sub-cavities that are interconnected by a connecting passage, wherein a first cell partition and a second cell partition enclose a first sub-cavity, and wherein the cavity is filled with helium that functions as a heat-storing material;
a plurality of flow passages disposed between individual sub-cavities, wherein helium that functions as a working gas flows through the flow passages;
a pressure-equalizing opening that penetrates the cell wall and forms a connection between the helium that functions as the working gas outside the cavity and the helium that functions as the heat-storing material inside the cavity; and
a plurality of supporting elements disposed inside the sub-cavities, wherein the first cell partition is separated from the second cell partition by the supporting elements, and wherein the supporting elements brace the first cell partition against the second cell partition.

15. The regenerator of claim 14, wherein the first cell partition and the second cell partition impart a tubular shape to the first sub-cavity.

16. The regenerator of claim 14, wherein the first sub-cavity has an internal meander shape formed by the supporting elements, the first cell partition, and the second cell partition.

17. The regenerator of claim 14, wherein the supporting elements extend from the cell wall into the first sub-cavity.

18. The regenerator of claim 17, wherein the supporting elements include holes through which helium can pass.

19. The regenerator of claim 14, wherein the first cell partition is planar.

20. The regenerator of claim 14, wherein the first cell partition is cylindrical.

* * * * *